(12) United States Patent
Doser

(10) Patent No.: US 9,106,914 B2
(45) Date of Patent: Aug. 11, 2015

(54) METHOD AND SYSTEM FOR WEIGHTED ENCODING

(75) Inventor: Ingo Tobias Doser, Burbank, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 837 days.

(21) Appl. No.: 12/226,856

(22) PCT Filed: May 25, 2006

(86) PCT No.: PCT/US2006/020423
§ 371 (c)(1),
(2), (4) Date: Oct. 30, 2008

(87) PCT Pub. No.: WO2007/139534
PCT Pub. Date: Dec. 6, 2007

(65) Prior Publication Data
US 2009/0067506 A1    Mar. 12, 2009

(51) Int. Cl.
*H04N 7/12*       (2006.01)
*H04N 19/17*      (2014.01)
(Continued)

(52) U.S. Cl.
CPC ............. *H04N 19/17* (2014.11); *H04N 19/115* (2014.11); *H04N 19/124* (2014.11); *H04N 19/126* (2014.11); *H04N 19/154* (2014.11); *H04N 19/176* (2014.11); *H04N 19/60* (2014.11)

(58) Field of Classification Search
CPC ... H04N 19/157; H04N 19/184; H04N 19/61; H04N 19/00084; H04N 19/00212; H04N 19/00278; H04N 19/00309; H04N 19/00369; H04N 19/00478; H04N 19/00545; H04N 19/00775; H04N 19/00781; H04N 19/102; H04N 19/176; H04N 19/186; H04N 19/196; H04N 19/42; H04N 19/46; H04N 19/59; H04N 19/60; H04N 7/26074; H04N 7/26101; H04N 7/26207; H04N 7/26244; H04N 7/26287; H04N 7/26313; H04N 7/26702; H04N 19/115; H04N 19/17; H04N 19/126; H04N 19/154; H04N 19/124; H04N 19/00096; H04N 7/12; H04N 7/18

USPC ............ 375/240.18, E7.134, E7.145, 240.24; 382/232, 239; 358/1.1, 1.8; 348/229.1; 345/690; 341/61
See application file for complete search history.

(56) References Cited

U.S. PATENT DOCUMENTS 5,327,524 A *   7/1994   Ng .................................. 358/1.8
5,499,060 A     3/1996   Gove et al.
(Continued)

FOREIGN PATENT DOCUMENTS

EP       0693857          1/1996
EP       1569458 A1       8/2005
(Continued)

OTHER PUBLICATIONS

Search Report Dated Feb. 27, 2007.

*Primary Examiner* — Thanhnga B Truong
(74) *Attorney, Agent, or Firm* — Robert D. Shedd; Joseph J. Opalach

(57) ABSTRACT

A method and system for weighted encoding of image data includes a transformation device configured to determine a non-linear transformation function for use in weighting an encoding of image data such that selected areas of the image data where increased detail is desired are encoded using a disproportionately greater number of bits of a total number of bits available for characterizing the image data. The system of the present invention can further include an encoding device configure to encode the weighted image data. In one embodiment of the present invention, the transformation device includes an analysis device configured to arrange pixel information into groups according to bit depths of the pixels of the image data, a post processing device configured to receive the organized pixel information and determine respective gains for the groups, and a transformation generation device configured to determine the transformation function based upon the respective gains.

20 Claims, 8 Drawing Sheets

(51) Int. Cl.
   *H04N 19/176* (2014.01)
   *H04N 19/115* (2014.01)
   *H04N 19/60* (2014.01)
   *H04N 19/124* (2014.01)
   *H04N 19/126* (2014.01)
   *H04N 19/154* (2014.01)

(56) References Cited

U.S. PATENT DOCUMENTS

| | | | |
|---|---|---|---|
| 5,568,570 A | 10/1996 | Rabbani | |
| 5,651,078 A | 7/1997 | Chan | |
| 5,909,249 A | 6/1999 | Sathe et al. | |
| 6,078,689 A | 6/2000 | Kunitake et al. | |
| 6,560,285 B1 | 5/2003 | Reitmeier et al. | |
| 7,460,722 B2* | 12/2008 | Henry | 382/239 |
| 7,738,555 B2* | 6/2010 | Haskell et al. | 375/240.03 |
| 7,860,168 B2* | 12/2010 | Winger | 375/240.24 |
| 8,611,421 B1 | 12/2013 | Efremov et al. | |
| 2002/0141498 A1 | 10/2002 | Martins et al. | |
| 2005/0253937 A1* | 11/2005 | Moholt et al. | 348/229.1 |
| 2006/0056711 A1* | 3/2006 | Lee et al. | 382/232 |
| 2006/0066640 A1* | 3/2006 | Kothari et al. | 345/690 |
| 2009/0067506 A1 | 3/2009 | Doser | |

FOREIGN PATENT DOCUMENTS

| | | |
|---|---|---|
| JP | 64012764 | 1/1989 |
| JP | 7502154 | 3/1995 |
| JP | 8065668 | 8/1996 |
| JP | 10336655 | 12/1998 |
| JP | 2000287200 | 10/2000 |
| JP | 2002508606 | 3/2002 |
| JP | 2002542739 | 12/2002 |
| JP | 2009524371 | 6/2009 |
| JP | 5384330 | 10/2013 |
| KR | 100389892 | 3/1998 |
| KR | 100335585 | 4/2002 |
| WO | 9311629 | 6/1993 |
| WO | WO 98/36573 | 8/1998 |
| WO | WO 99/49412 | 9/1999 |
| WO | 2005104035 A1 | 11/2005 |
| WO | 2006031737 A2 | 3/2006 |
| WO | WO2006/031737 | 3/2006 |

* cited by examiner

METHOD AND SYSTEM FOR WEIGHTED ENCODING

This application claims the benefit, under 35 U.S.C. §365 of International Application PCT/US2006/020423, filed May 25, 2006 which was published in accordance with PCT Article 21(2) on Dec. 6, 2007 in English.

FIELD OF THE INVENTION

The present invention generally relates to digital image methods and systems and, more particularly, to improving the precision of an image where bit depth has been reduced for storage or transmission.

BACKGROUND OF THE INVENTION

When storing, compressing or transmitting a picture or video content, digital data includes constrained bit depths. Each pixel of a screen image can be displayed using a combination of three different color signals, for example red, green and blue, however combinations of different colors and even different numbers of colors can be implemented. The appearance of each pixel (region) is controlled by the intensity of the combinations of colors. The amount of information that is stored about a pixel determines its color depth, which controls how precisely the pixel's color can be specified. This is also typically referred to as the bit depth, because the precision of color depth is specified in bits. The more bits that are used per pixel, the finer the color detail of the image. However, increased color depths also require significantly more memory for storage or transmission of an image, and also generate more data to process.

Picture material and video content are available with high bit depth providing a high color accuracy and a high dynamic range, however, current transmission media and storage formats put limitations on the amount of data that can be processed. In many instances, compression or bandwidth limitations forces the bit depth to be reduced.

Therefore, a need exists for a method and system that optimizes the bit depth constraints to improve the precision of a picture when reducing the bit depth for storage or transmission and for providing high quality graphics while enabling storage and transmission compatible with current transmission and storage techniques.

SUMMARY OF THE INVENTION

The present invention advantageously provides a method and system for weighting image data for providing maximum image precision from available bit depth. In one embodiment of the present invention, a method for weighted encoding of image data includes determining a non-linear transformation function for use in weighting received image data such that selected areas of the image data where increased detail is desired are encoded using a greater number of for characterizing the image data.

In one embodiment of the present invention, a method for determining a non-linear transformation function for use in weighting an encoding of received image data includes arranging pixel information into groups according to bit depths of the pixels of the image data, determining respective gains for the groups, wherein the respective gains are dependent upon a respective number of pixels in the groups, and determining the transformation function based upon the respective gains.

In an alternate embodiment of the present invention, a system for weighted encoding includes a transformation device configured to determine a non-linear transformation function for use in weighting image data such that selected areas of the image data where increased detail is desired are encoded using a disproportionately greater number of bits of a total number of bits available for characterizing the image data. The system of the present invention can further include an encoding device configure to encode the weighted image data. In one embodiment of the present invention, the transformation device includes an analysis device configured to arrange pixel information into groups according to bit depths of the pixels of the image data, a post processing device configured to receive the organized pixel information and determine respective gains for the groups, and a transformation generation device configured to determine the transformation function based upon the respective gains.

BRIEF DESCRIPTION OF THE DRAWINGS

The teachings of the present invention can be readily understood by considering the following detailed description in conjunction with the accompanying drawings, in which.

Figure 1:
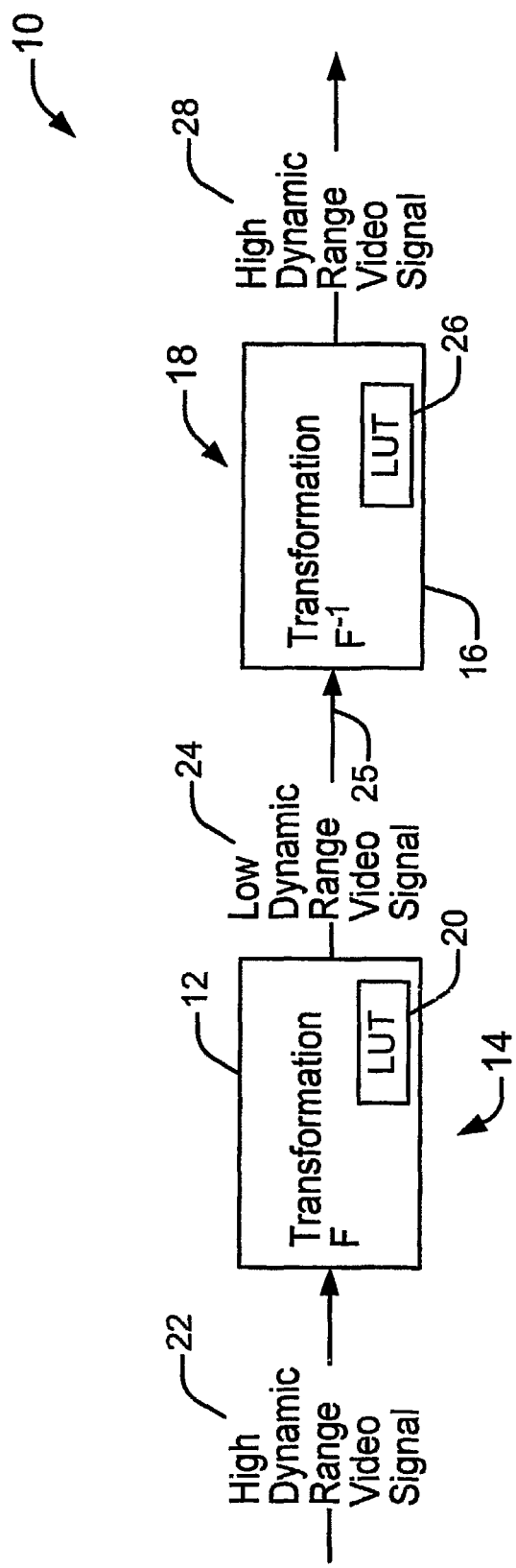
FIG. 1 depicts a high level block diagram of a system for weighting image data for providing maximum use from available bit depth in transferring image data or reading/writing data to storage in accordance with one embodiment of the present invention.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides a method and system for weighting image data for providing maximum image precision from available bit depth. Although the present invention will be described primarily within the context of image data and video storage and transmission systems for encoding and decoding a high dynamic range video signal, the specific embodiments of the present invention should not be treated as limiting the scope of the invention. It will be appreciated by those skilled in the art and informed by the teachings of the present invention that the concepts of the present invention can be advantageously applied to substantially any input signal in substantially any digital multimedia system, which is capable of storage, compression, and/or transmission. In addition, the concepts of the present invention are applicable to any transmission method including data transferred by telephone, set top boxes, computer, satellite links, computers, between computers, between a processor and a video card, etc.

The present invention provides a method and system for providing maximum image precision from available bit depth. One embodiment, utilizes the available code range or bit depth more efficiently by implementing a non linear transformation function to devote more code values for regions where quantization artifacts are more likely than for those which are either not present or there is little expectation of quantization artifacts.

In accordance with the present invention, a maximum number of available levels for one or multiple regions of interest can be provided by sacrificing accuracy on levels which are not of interest. For example, in a picture where a person is lit well and stands in front of a background that is relatively dark, concentration is placed on the available levels on the picture foreground colors which will most probably be skin tones, and, if necessary, on the dark background colors.

The functions of the various elements and devices depicted in the figures can be provided through the use of dedicated hardware as well as hardware capable of executing software in association with appropriate software. When provided by a processor, the functions can be provided by a single dedicated processor, by a single shared processor, or by a plurality of individual processors, some of which may be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage.

FIG. 1 depicts a high level block diagram of a system for weighting image data for providing maximum use from available bit depth in transferring image data or reading/writing data to storage in accordance with one embodiment of the present invention. The system 10 of FIG. 1 illustratively comprises a transformation device 12 and an inverse transformation device 16. More specifically, in the system 10 of FIG. 1, truncation losses are reduced in accordance with the present invention by introducing the transformation device 12 on a source side 14 and the inverse transformation device 16 for that transformation on a sink side 18. In the case of memory storage and data transfer, an encoding transformation device 12 is provided on a transmission side before writing and a decoding transformation device 16 is provided on a reception side after reading.

In one embodiment of the present invention, the transformation device 12 of system 10 can apply a transformation function (F) to a received signal by using, for example, a one dimensional lookup table (1-D LUT) 20 (i.e., all color signals share the same Look Up Table). In an alternate embodiment of the present invention, three or more 1-D LUTs 20 (i.e., one for each color signal or one for each pixel color component: red, green, and blue) can be implemented to apply a transformation function (F) to a received signal. More specifically, in an embodiment of the present invention depicted by the system 10 of FIG. 1, a high dynamic range video signal 22 is communicated to the transformation device 12 where Look-Up-Tables 20 can be applied to the video signal 22 prior to truncation to provide a smaller dynamic range signal 24. For example, if the high dynamic range video signal 22 includes a 10 bit red, green, blue (RGB) signal and an LUT 20 is applied in accordance with the present invention, the output of the transformation device 12 can comprise an 8 bit RGB signal 24. The LUT 20 adjusts the levels or bit depths of the pixels in the data stream or image by using more levels (bit depth) for characterizing regions or areas of interest (i.e., amplitude characterization) while reducing a number of levels (bit depth) used to characterize other regions.

In accordance with the embodiment of the present invention of the system 10 of FIG. 1, the weighted encoding is performed at the source side 14. Regions of interest can be predetermined or programmed in advance, having been set in accordance with a specific region of a picture screen, determined based on histogram analysis of the images or by using other criteria including psycho-visual parameters such as different contrast sensitivity for lower light levels compared to higher light levels. Although the transformation device 12 of the system 10 of FIG. 1 is depicted as comprising an LUT, the transformation functions of the present invention do not require the implementation of an LUT. Instead, in alternate embodiments of the present invention, other means can be employed for applying a transformation function in accordance with the present invention, such as providing a gamma offset, a gain offset, or providing coefficients for a polynomial to determine and generate a transformation function.

On the sink side 18 of the system 10 of FIG. 1, an inverse transformation ($F^{-1}$) is provided. For example, on the sink side 18 of the system 10 of FIG. 1, an inverse LUT 26 is provided. That is, in the inverse transformation device 18, an inverse LUT 26 can be obtained by exchanging abscissa (i.e., plotting input video level of LUT in the least significant bit) and ordinate (i.e., plotting output video level in least significant bits) of a transformation curve representing the LUT 20 of the transformation device 12. The constrained lower dynamic range signal 24 is communicated to the inverse transformation device 18 where the inverse LUT 26 applies to the lower dynamic range signal 24 an inverse function as described above. The inverse transformation device outputs 18 a high dynamic range signal 28 with a higher dynamic range as compared to a signal comprising of a simple truncation of the lower dynamic range signal 24 as is provided by typical prior art digital transmission systems. The lower dynamic range signal 24, provided using the concepts of the present invention, can be transmitted by any known transmission means, such as a wired or wireless transmission line 25, or, as in the case of memory access or storage, by substantially any electrical connection means 25.

Figure 2:
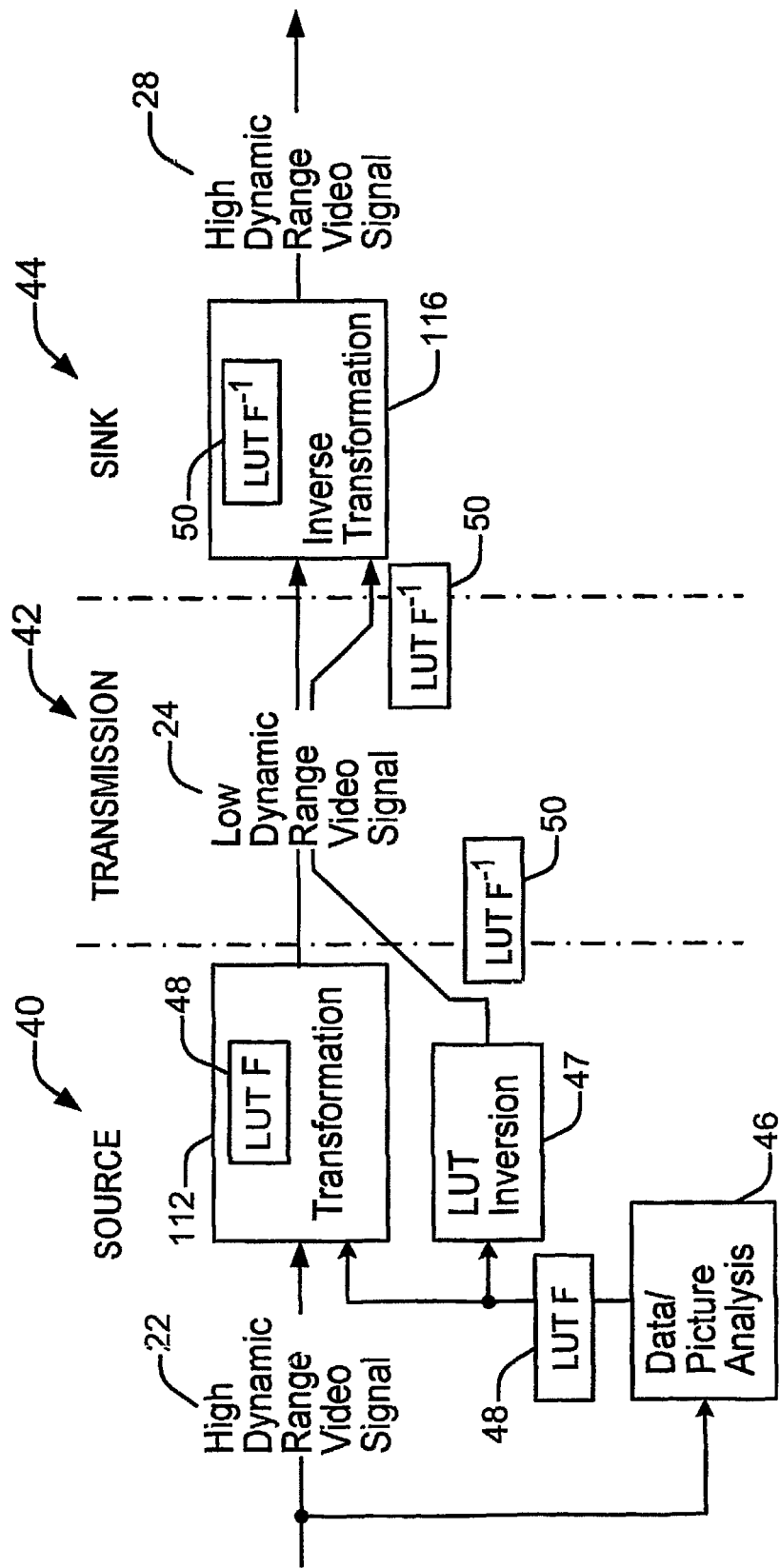
FIG. 2 depicts a high level block diagram of a system for weighting image data for providing maximum use from available bit depth in transferring image data or reading/writing data to storage in accordance with an alternate embodiment of the present invention.

FIG. 2 depicts a high level block diagram of a system for weighting image data for providing maximum use from available bit depth in transferring image data or reading/writing data to storage in accordance with an alternate embodiment of the present invention. The system of FIG. 2 comprises a transformation device 112, an LUT inversion device 47, a data/picture analysis device 46 and an inverse transformation device 116. The system of FIG. 2 is illustratively divided into three sections, a source section 40, a transmission media section 42 and a sink section 44. The data/picture analysis device 46 applies a transformation function LUT F 48 to a received high dynamic range video signal 22 according to preferred transformation characteristics. The transformation function LUT F 48 is implemented for weighted encoding of a received picture or video content for transmission or storage. As previously described, the transformation function can comprise a Look-Up Table (LUT), an inline function, or a combination of both, for applying the transformation function to a received high dynamic range video signal 22. In accordance with the present invention, a respective Look-Up Table, inline function, or a combination or both, can be implemented for each of the colors (e.g., red, green, and blue) of the high dynamic range video signal 22.

In the system of FIG. 2, the transformation function LUT F 48 of the transformation device 112 is inverted in the inversion device 47. In the system of FIG. 2, the inverse transformation function LUT $F^{-1}$ 50 determined by the inversion device 47 is communicated to the sink section 44 of the system 100. In one embodiment of the present invention, the inverse transformation function LUT $F^{-1}$ 50 is communicated with the transformed picture content to the sink section 44 of the system 100 to be applied by the inverse transformation device 116 for decoding the received picture and outputting a high dynamic range signal 28. In an alternate embodiment of the present invention, the inverse transformation function LUT $F^{-1}$ 50 determined by the inversion device 47 is communicated directly to the inverse transformation device 116. Again, the inverse transformation function LUT $F^{-1}$ 50 is applied by the inverse transformation device 116 for properly decoding the received picture. The output of the inverse transformation device 116 can then be communicated to a display or storage device. If encoded picture information from the transformation device 116 is to be stored previous to decoding, the decoding inverse transformation function LUT $F^{-1}$ 50 is stored along with the data for later decoding. In accordance with the present invention, the decoding inverse transformation function LUT $F^{-1}$ 50 and information can be stored with the picture information as metadata.

A transformation function and inverse transformation function in accordance with the present invention can be established for application to a received high dynamic range video signal in a plurality of ways. For example, in one embodiment of the present invention, the functions can be applied to a received video signal on a pixel by pixel basis, which may not be the most efficient technique, but can be preferred in some applications. Other methods for application of the transformation and inverse transformation functions can include a picture block-wise transmission method, a summary transmission method for several pixels at a time, frame-wise (where each picture has its own transformation and inverse transformation function), scene-wise, for a motion picture (based on the fact that it is very likely that the colors of each individual frame within a scene look alike), etc. It is also a possible to have a constant function defined once per movie or for a block of data.

In accordance with an embodiment of the present invention, transformation functions can be derived using histograms. More specifically, histogram-based methods can be employed to determine which portions of a transmission curve need more precision (higher bit depth) and which portions of the transmission curve need less precision (lower bit depth and less code values available than the higher bit depth signal). Histogram methods provide a way for determining where quantization artifacts are likely to occur in an image. Quantization artifacts can have several appearances. One most common artifact visible in images includes visible stepping instead of a shallow slope. Shallow slopes in a picture can occur on "flat" areas, which are almost uniform in color. They occur, for example, in the form of walls in the background or cheeks of human faces.

Quantization artifacts (also called Mach Banding) are most apparent in picture areas that are perceived as "flat". This can be a shallow color transition on a background wall or soft color transitions on a human face. One way of detecting these "flat" areas is to use a histogram analysis. These "flat" areas yield high histogram output values because they provide a high amount of pixel values that are similar or close enough to fall within the same histogram bin. The transmission or transfer curve can be modified as described below. For example, FIG. 6 depicts three histograms 302, 304 and 306 employed in creating transfer curves 310, 312, and 314 for transformation of an example picture 202 depicted in FIG. 5. Details regarding the relationship between a histogram and transfer curves will be described in more detail below.

Figure 3:
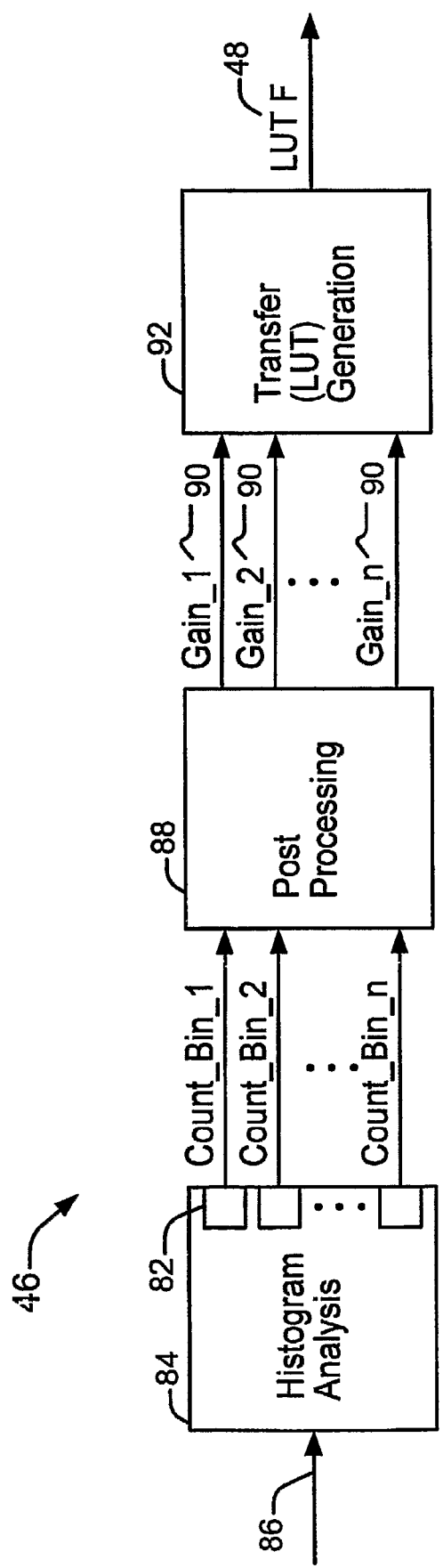
FIG. 3 depicts a high level block diagram of a data/picture analysis device suitable for use in the system of FIG. 2 in accordance with an embodiment of the present invention.

FIG. 3 depicts a high level block diagram of a data/picture analysis device 46 suitable for use in the system 100 of FIG. 2 in accordance with an embodiment of the present invention. The data/picture analysis device 45 of FIG. 3 illustratively comprises a histogram analysis device 84, a post processing device 88 and a transformation generation device 92. In the histogram analysis device 84 of FIG. 3, there are illustratively n bins 82 having output counts labeled Count_Bin__1 through Count_Bin_n. Although the data/picture analysis device 46 of FIG. 3 is depicted as comprising a histogram analysis device 84, it should be understood that the histogram analysis device is only one possible analysis device and other methods or means of categorizing pixels can also be employed in accordance with the present invention.

The histogram analysis device 84 creates a histogram of pixel information and the number of occurrences of a pixel having characteristics that meet the criteria for each bin 82. For example, in one embodiment of the present invention, the pixel value of each pixel is used as criteria for which pixels will be placed in which bins 82. In such an example, the "n" bins 82 are used to categorize and sort picture levels into n respective bins. Furthermore, a histogram as described above can be created for each pixel color (e.g., red, green and blue).

Referring to FIG. 6, FIG. 6 illustratively depicts three histograms 302, 304 and 306 employed in creating transfer curves 310, 312 and 314 for generating a transformation function 308 in accordance with the present invention. In FIG. 6, each histogram 302, 304 and 306 corresponds to a different color, where histogram 302 corresponds to red, histogram 304 corresponds to green and histogram 302 corresponds to blue. In the example of FIG. 6, each histogram 302, 304, and 306 includes eight bins (x-axis). The bins each include a number of pixels (pixel counts on the y-axis) having pixel values in an image or portion of the image corresponding to a respective bin. In the example of FIG. 6, the bins are associated with the brightness levels of the pixels in an ascending order. The transformation curves 310, 312 and 314 of FIG. 6 plot an input video level of a transformation function (e.g., an LUT) in LSBs (abscissa) versus an output video level in LSBs (ordinate).

Referring back to FIG. 3, a video signal (picture) is received by the histogram analysis device 84. A histogram of the received picture 86 is derived by means of a histogram binning process, which can employ methods known in the art. Output signals, e.g., Count_Bin__1 through Count_Bin_n, which are the signals from the n bins of the histogram processing in the histogram analysis device 84, are then communicated to a post processing device 88. The post processing device 88 determines gain values 90, Gain__1 through Gain_n, for use by the transformation generation device 92 to determine a transformation function (e.g., LUT).

Figure 4:
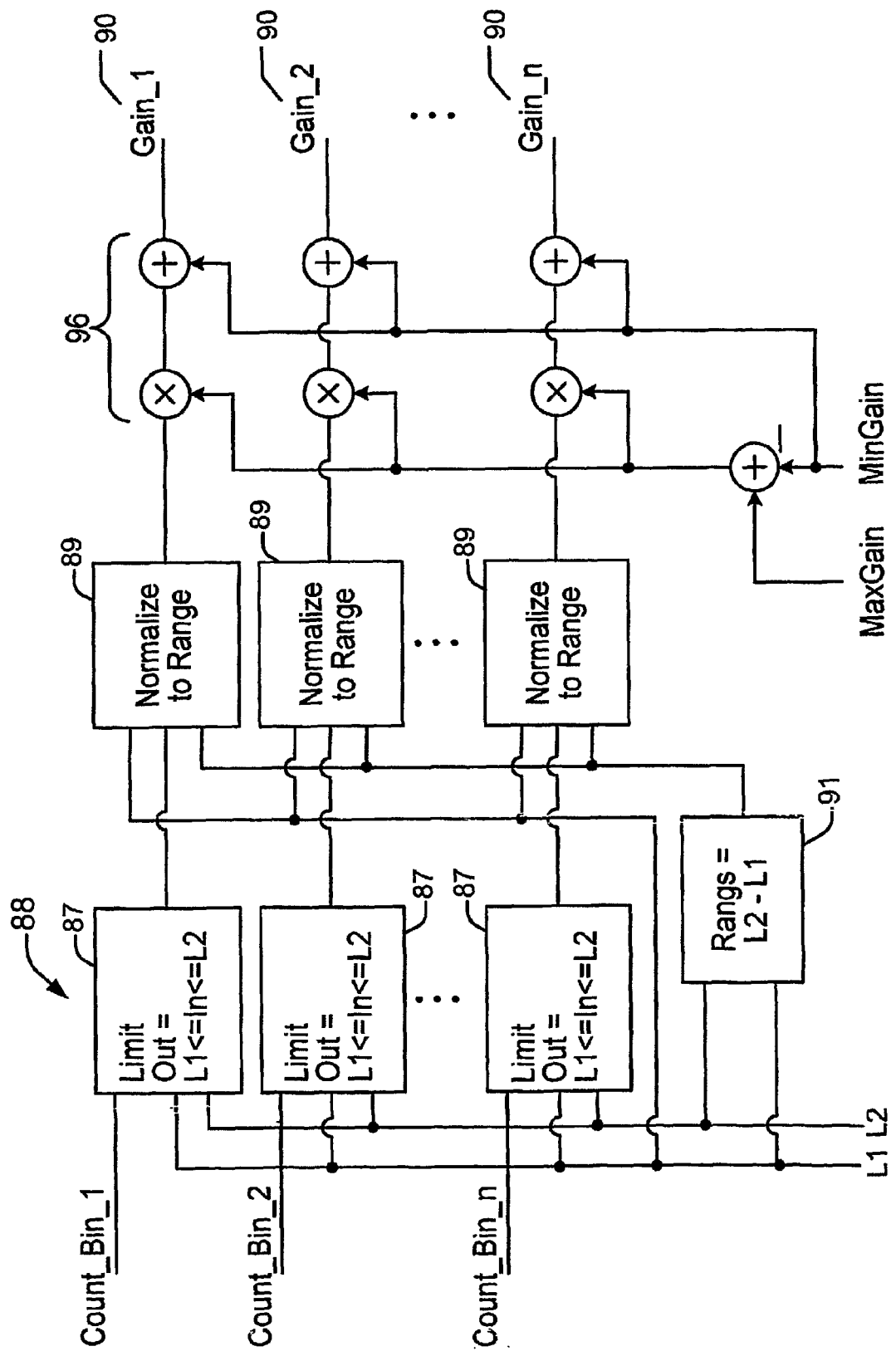
FIG. 4 depicts a high level block diagram of a post processing device suitable for use in the data/picture analysis device of FIG. 3 in accordance with an embodiment of the present invention.

FIG. 4 depicts a high level block diagram of a post processing device suitable for use in the data/picture analysis device 46 of FIG. 3 in accordance with an embodiment of the present invention. The post processing device 88 of FIG. 4 illustratively comprises an equal amount of output signals 90 which correspond to Gain_1 through Gain_n for n segments of the histogram function determined by the number, n, of the histogram bins 82. The post processing device 88 illustratively comprises four inputs for enabling the input of constants or functions. The constants/functions include L1, L2, Min_gain and Max_gain. L1 and L2 respectively determine minimum and maximum limits on the numbers of samples (e.g., bounds on the number of pixels in each bin 82) that span a range of sensitivity in which gains need to be adjusted between limits, Min_gain and Max_gain.

The Min_gain and Max_gain are limits to the gain that respectively correspond to a minimum (L1) and to a maximum (L2). In one illustrative embodiment, Min_gain and Max_gain can be for example, 0.5 and 2, respectively. L1 and L2 can include, for example, 1/20 and 1/8, respectively, of a number of samples in the image or image window. Min_gain applies to L1, and Max_gain applies to L2. A limit determination is made in limit device 87 to limit the input of the normalization device 89 to values between L1 and L2. For bin count values less than L1, an output value for L1 is produced, and for bin count values greater than L2, an output value of L2 is produced. A normalized value for the bin count is computed in normalization devices 89 to define the range between L1 and L2 in a range device 91. The output of normalization devices 89 are equal to 0 for bin counts smaller or equal to count value L1, and they are equal to 1 for bin counts larger or equal to count value L2. The gains (e.g., Gain_1, etc.) are calculated for each segment corresponding to the bins. This can be performed by using the normalized bin count from normalization devices 89 and using logic circuitry 96 to calculate a proportional gain.

In one illustrative embodiment, post processing block 88 calculates gain in accordance with equations one (1) and two (2), which follow:

$$hist2=(min(max(hist1,L1),L2)-L1)/(L2-L1) \quad (1)$$

(where hist1 is a bin count between L2 and L1 [labeled "IN" in FIG. 4])

$$gain=hist2*(max\_gain-min\_gain)+min\_gain. \quad (2)$$

Referring again to FIG. 3, the transformation generation device 92 segments the input range into n zones where n is equal to the number of bins 82 for the histogram and equal to the number of gain values 90 from the post processing device 88. Each zone has its own gain as described above. Starting at 0, each element of the output transformation LUT F 48 is determined by a previous transformation value plus the gain. This is the input value adjusted by the differential value to create the output value. In one example, the transformation can be assembled using n straight lines or other such mathematical processes. Each line, m, is defined by its starting point (which is the end point of the line m−1) and the slope (gain).

Figure 5:
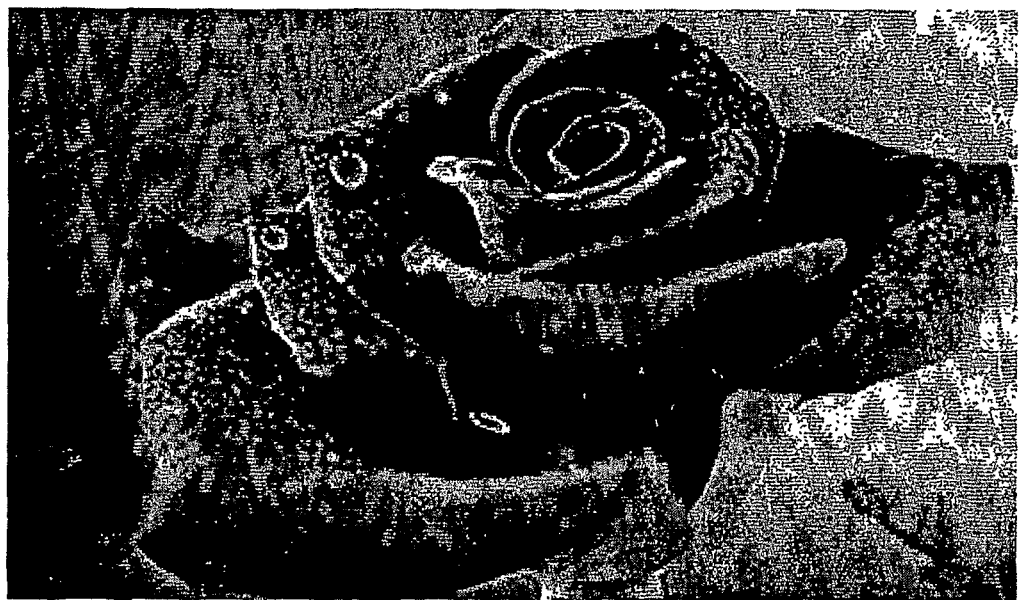
FIG. 5 depicts an illustrative image for processing in accordance with an embodiment of the present invention.
Figure 6:
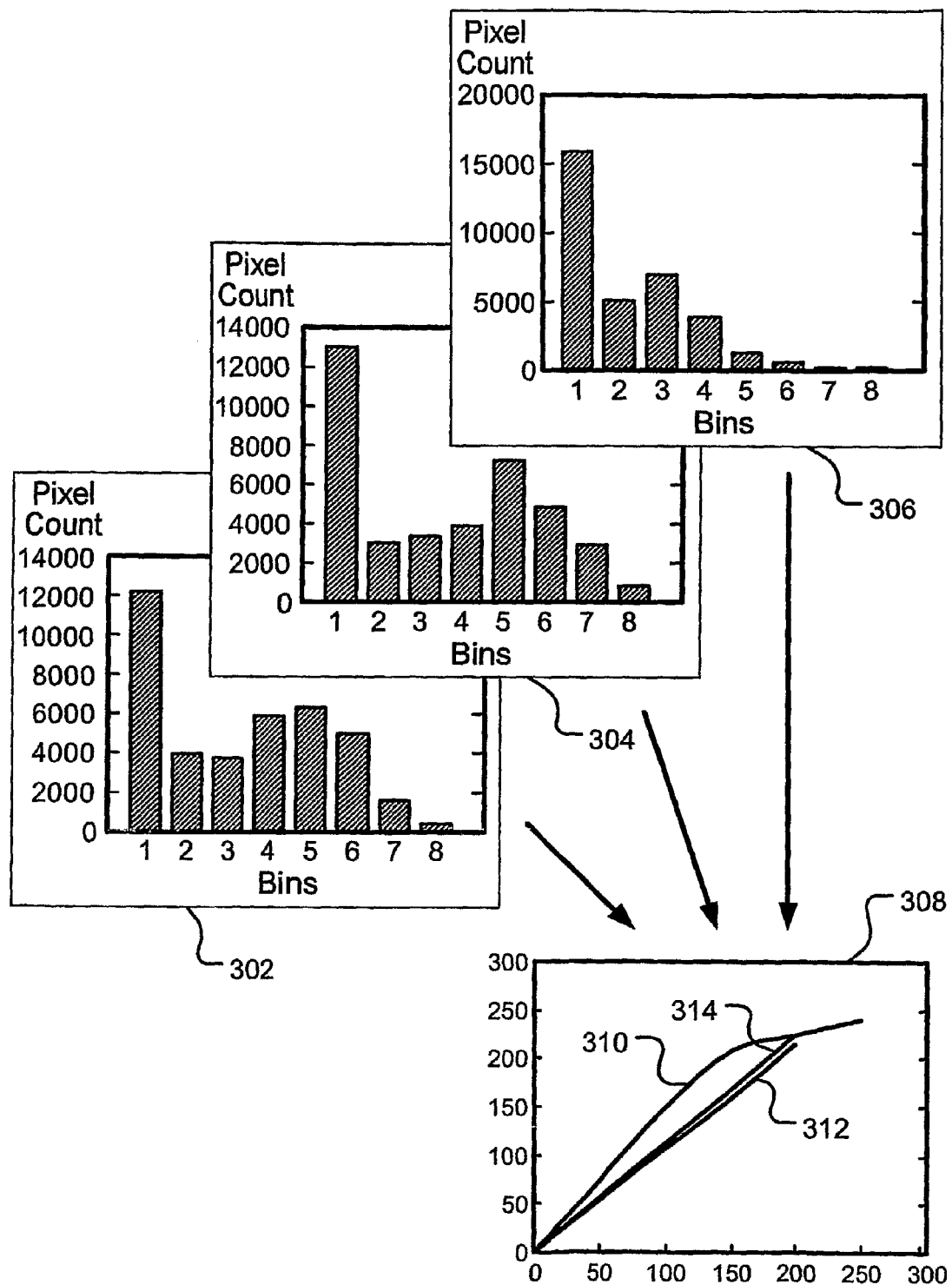
FIG. 6 depicts three histograms employed in creating transfer curves for generating a transformation in accordance with an embodiment of the present invention.

FIG. 5 depicts an illustrative image 202 to which the concepts of the present invention can be applied in accordance with an embodiment of the present invention. That is, the image of FIG. 5 is processed using a histogram analysis as described above to determine transfer curves (transformations) used in processing video or image data as depicted in FIG. 6. That is, referring back to FIG. 6, histograms 302, 304 and 306, corresponding to red, green and blue pixel colors are used to generate transfer curves 310 (for red), 312 (for green) and 314 (for blue). The values of the transfer curves determine the transformation function (e.g., LUT) for supporting the weighted encoding of the video signal for storage or transmission.

Figure 7:
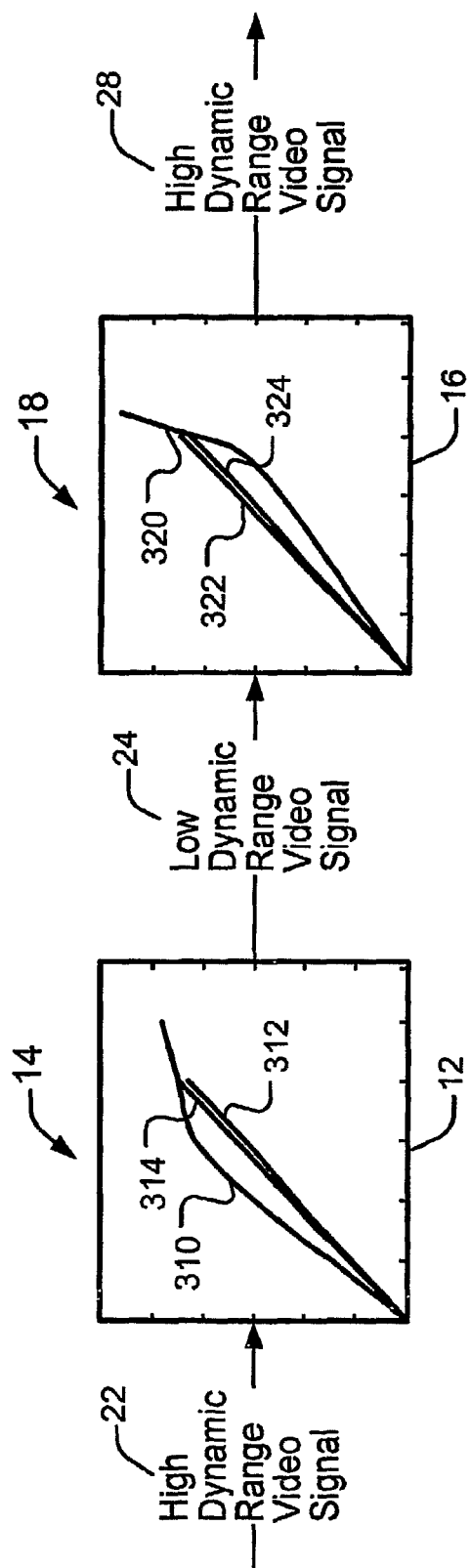
FIG. 7 depicts respective plots illustrating a transformation function and an inverse transformation function in a storage or transmission system in accordance with an embodiment of the present invention.

FIG. 7 depicts respective plots illustrating a transformation function and an inverse transformation function for use in a storage or transmission system in accordance with an embodiment of the present invention. In FIG. 7, the transfer curves 310, 312 and 314 of FIG. 6 are used in the transformation device 12 for encoding an input high dynamic range video signal. Curves 320, 322, and 324 are used in the inverse transformation device 16 for decoding the transformed low dynamic range video signal. That is, in one embodiment of the present invention LUTs are implemented to encode the pixel information of the high dynamic range video signal using weighted information (gains) to redistribute pixel data to create a low dynamic range video signal transmitted between the source 14 and the sink 18. The low dynamic range video signal is then decoded using the inverse LUTs at the sink.

Figure 8:
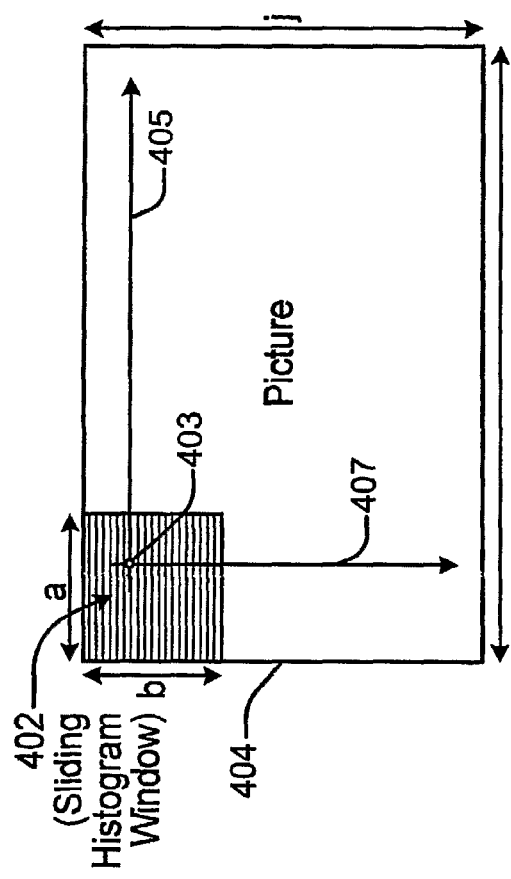
FIG. 8 depicts a schematic diagram of a sliding window implemented for determining histograms in accordance with an embodiment of the present invention.

FIG. 8 depicts a schematic diagram of a sliding window implemented for determining histograms in accordance with an embodiment of the present invention. As depicted in FIG. 8, in an optional implementation of the present invention, optimal results can be achieved by creating a histogram with a sliding window 402. More specifically, provided that L2, which determines the maximum number of pixels in a bin to invoke Max_Gain, is much smaller than the total number of samples of the picture, even better results can be achieved by individual analysis of portions of the pictures and combining the results instead of doing a single global analysis as described above. Using a sliding window 402 of the present invention ensures that the pixel values are actually found in a specific picture area of interest and are not spread over the entire picture. In one embodiment of the present invention, a sliding window 402 that is smaller than a picture size (i×j) 404 of the subject histogram analysis can be implemented. For example, if a step size of the sliding window is equal to one (1) pixel, depicted by numeral 403, and one (1) line in two dimensions (depicted by numerals 405 and 407), then as a result (i−a)×(j−b) values will be obtained for each bin.

In such an embodiment, it is beneficial to perform a post processing step to choose a maximum of all runs for each of the bins as a result, to be sure that all picture regions and all important histogram regions have been sufficiently considered. All further processing can be performed as described above, however, L1 and L2 have to be chosen based on the window size 402 rather than the picture size 404.

Figure 9:
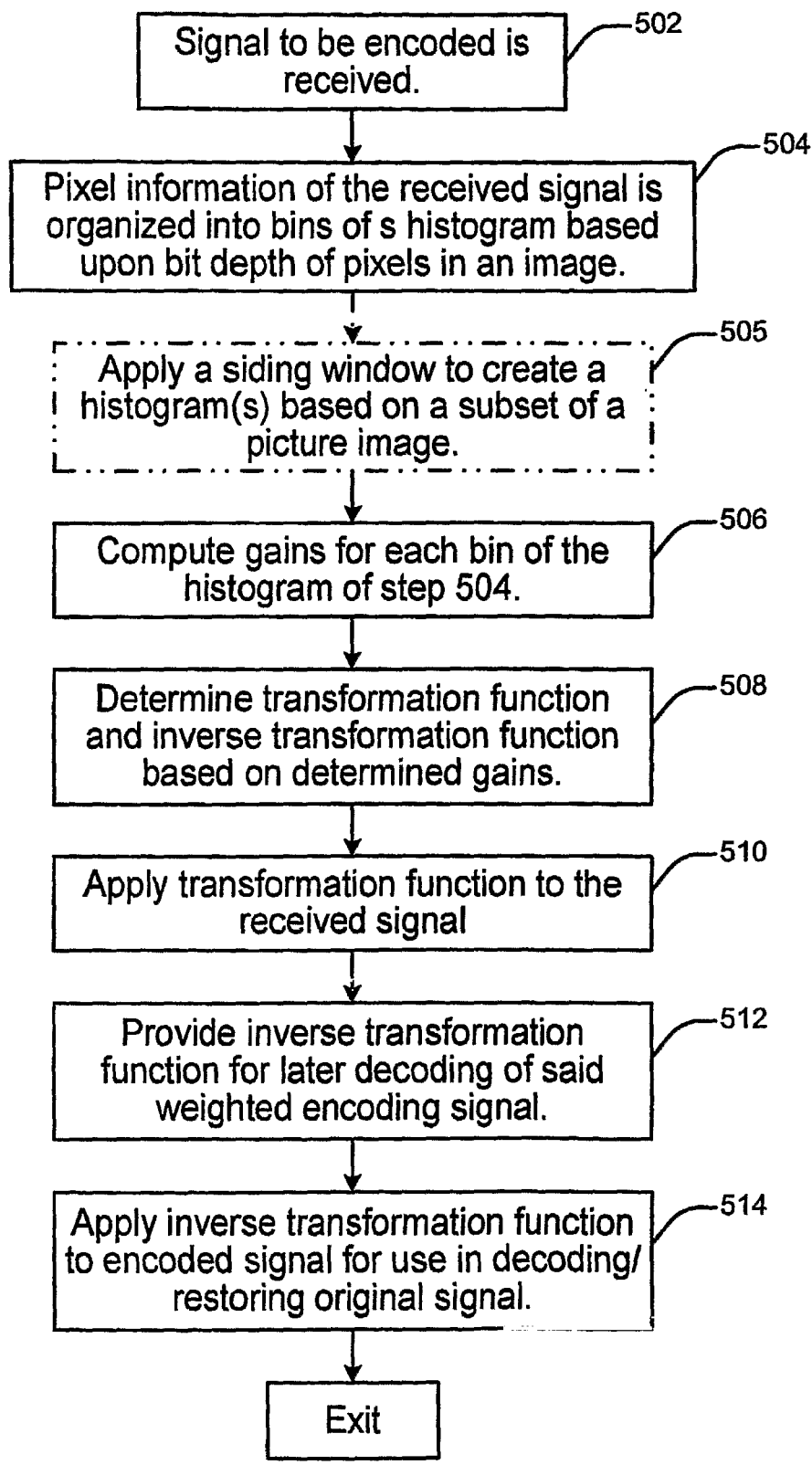
FIG. 9 depicts a flow diagram of a method for determining a non-linear transformation function for use in weighting an encoding of received image data in accordance with one embodiment of the present invention.

In accordance with the present invention, a method for weighted encoding of image data includes determining a non-linear transformation function for use in weighting an encoding of received image data such that selected areas of the image data where increased detail is desired are encoded using a disproportionately greater number of bits of a total number of bits available for characterizing the image data. FIG. 9 depicts a flow diagram of a method for determining a non-linear transformation function for use in weighting an encoding of received image data in accordance with one embodiment of the present invention. The method of FIG. 9 begins at step 502, where a signal (e.g., image data, video content, etc.) to be encoded for transmission or storage is received. The method then proceeds to step 504.

At step 504, pixel information (e.g., intensity of the colors or combinations of colors for each pixel) of the received signal is organized into bins of a histogram based upon bit depth of pixels in an image. The method then proceeds to step 506 or optionally to step 505.

At step 505, a sliding window is applied to create subset histograms. The sliding window is moved with respect to image data to provide a subset of the image data for creating the histograms. The method then proceeds to step 506.

At step 506, gains are computed for the bins of the histogram(s) created in step 504 based upon amounts of pixels in the bins. The method then proceeds to step 508.

At step 508, the computed gains are used to derive a transformation function and an inverse transformation function. The transformation function for transforming a first dynamic range signal (high dynamic range) to a second signal of lower dynamic range. The transformation function is determined based upon the gains of step 506. The transformation function can be expressed as one or more LUTs in step 508. The method then proceeds to step 510 to describe the application of the determined transformation function and inverse transformation function.

At step 510, the gains are implemented (i.e., the transformation function is applied to the received signal) to weigh portions of the received signal to place greater resolution or definition in selected areas of the received signal (image data). The selected areas of the image will include higher bit depth while other portions can include lower bit depth. In one embodiment of the present invention, the weightings are provided using LUTs. Using the weightings provided by the transformation functions, adjustments in the bit depth of the pixels are performed to optimize the bit depth across an image. The method then proceeds to step 512.

At step 512 a lower dynamic range signal is transmitted to a receiver or stored in a storage means. The inverse transformation function determined in step 508 can be transmitted along with the lower dynamic range signal for inverse transformation of the lower dynamic range signal or for storage. Alternatively, the inverse transformation function determined in step 508 can be directly provided to an inverse transformation device for later decoding. The method then proceeds to step 514.

At step 514, the inverse transformation function is applied to decode or restore the received signal to the high dynamic range of the original signal. The method is then exited.

Having described various embodiments for a method and system for weighting encoded image data to support a reduction in bit depth and support restoration of the bit depth upon receiving or accessing the image data (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof.

The invention claimed is:

1. A method for weighted encoding of image data, comprising:
    applying, using a transforming device, a non-linear transformation function to said image data such that selected areas of said image data where increased precision is desired are encoded with an increased bit depth, wherein the step of applying the non-linear transformation function further comprising:
    arranging pixel information into groups according to bit depths of the pixels of said image data;
    determining respective gains for said groups, wherein said respective gains are dependent upon a respective number of pixels in said groups; and
    determining said transformation function based upon said respective gains.

2. The method of claim 1, wherein said selected areas of said image data include areas where quantization artifacts are likely to occur.

3. The method of claim 1, further comprising:
    applying a sliding window to said image data to determine a subset of said image data for creating said groups.

4. The method of claim 1, wherein said groups comprise bins of a histogram.

5. The method of claim 1, wherein said gains are used to weigh said selected areas of said image data to adjust the bit depths of the pixels of said image data.

6. The method of claim 1, wherein said transformation function is applied to said image data using a lookup table.

7. The method of claim 6, wherein said lookup table comprises a respective lookup table for different colors of the pixels of said image data.

8. The method of claim 1, further comprising determining an inverse transformation function for use in decoding said image data.

9. A system for weighted encoding of image data, comprising:
    a transformation device configured to determine a non-linear transformation function to be applied to said image data such that selected areas of said image data where increased detail is desired can be encoded with an increased bit depth; and
    an encoding device configured to encode said image data;
    wherein said transformation device comprises:
        an analysis device configured to arrange pixel information into groups according to bit depths of the pixels of said image data;
        a post processing device configured to receive the organized pixel information and determine respective gains for said groups, wherein said respective gains are dependent upon a respective number of pixels in said groups; and
        a transformation generation device configured to determine said transformation function based upon said respective gains, said transformation function transforming said image data to a second signal of lower bit depth based upon the corresponding gains.

10. The system of claim 9, wherein said analysis device arranges pixel information into bins of a histogram based upon respective pixel values of said pixels.

11. The system of claim 9, wherein said transformation device comprises a lookup table for applying the transformation function to said image data.

12. The system of claim 11, wherein the lookup table includes a respective lookup table for different colors of the pixels of said image data.

13. The system of claim 9, further comprising an inverse transformation device configured to apply an inverse transformation function to said image data.

14. The system of claim 13, wherein said inverse transformation device comprises a lookup table for applying the inverse transformation function to said encoded image data.

15. The system of claim 14, wherein the lookup table includes a respective lookup table for different colors of the pixels of said image data.

16. The system of claim 9, wherein said analysis device arranges the pixel information based upon a sliding window, the sliding window determining a subset of said image data for creating said groups.

17. The system of claim 9, wherein said transformation device applies said transformation function to said image data for weighting said image data to be encoded.

18. A method for weighted encoding of image data, comprising:
- applying a transformation function to said image data such that selected areas of said image data where increased precision is desired are encoded with an increased bit depth; wherein said applying is performed using a transformation device, and said transformation function is applied to said image data using a lookup table; wherein the applying step further comprising:
- arranging pixel information into groups according to bit depths of the pixels of said image data;
- determining respective gains for said groups, wherein said respective gains are dependent upon a respective number of pixels in said groups; and
- determining said transformation function based upon said respective gains.

19. The method of claim 18, wherein said selected areas of said image data include areas where quantization artifacts are likely to occur.

20. The method of claim 18, wherein said transformation function comprises a non-linear transformation function.

* * * * *